S. B. TILY AND M. O. AND J. G. REHFUSS.
TAG PRINTING AND PINNING MACHINE.
APPLICATION FILED JULY 28, 1917.
1,326,806.
Patented Dec. 30, 1919.
9 SHEETS—SHEET 2.
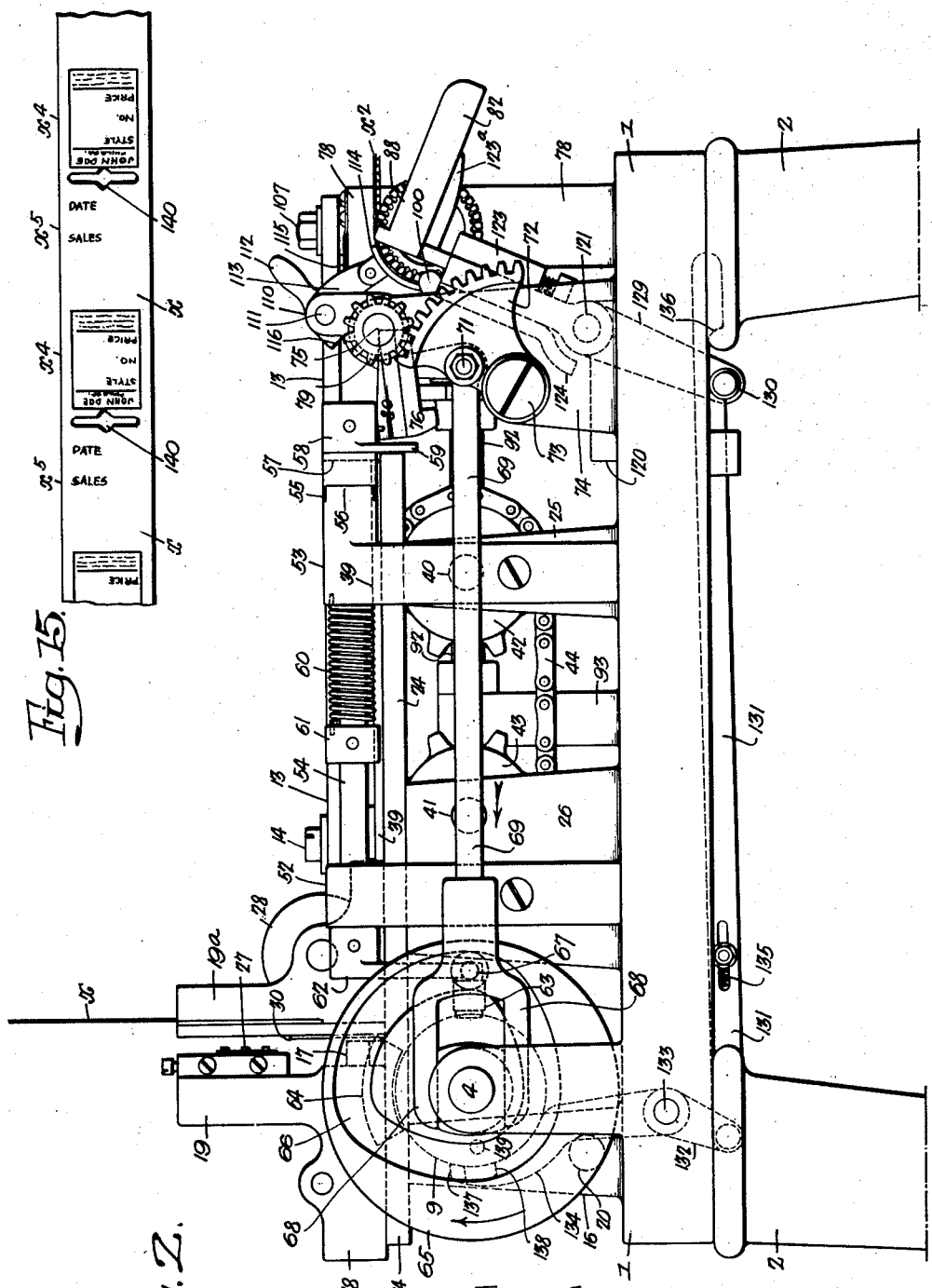

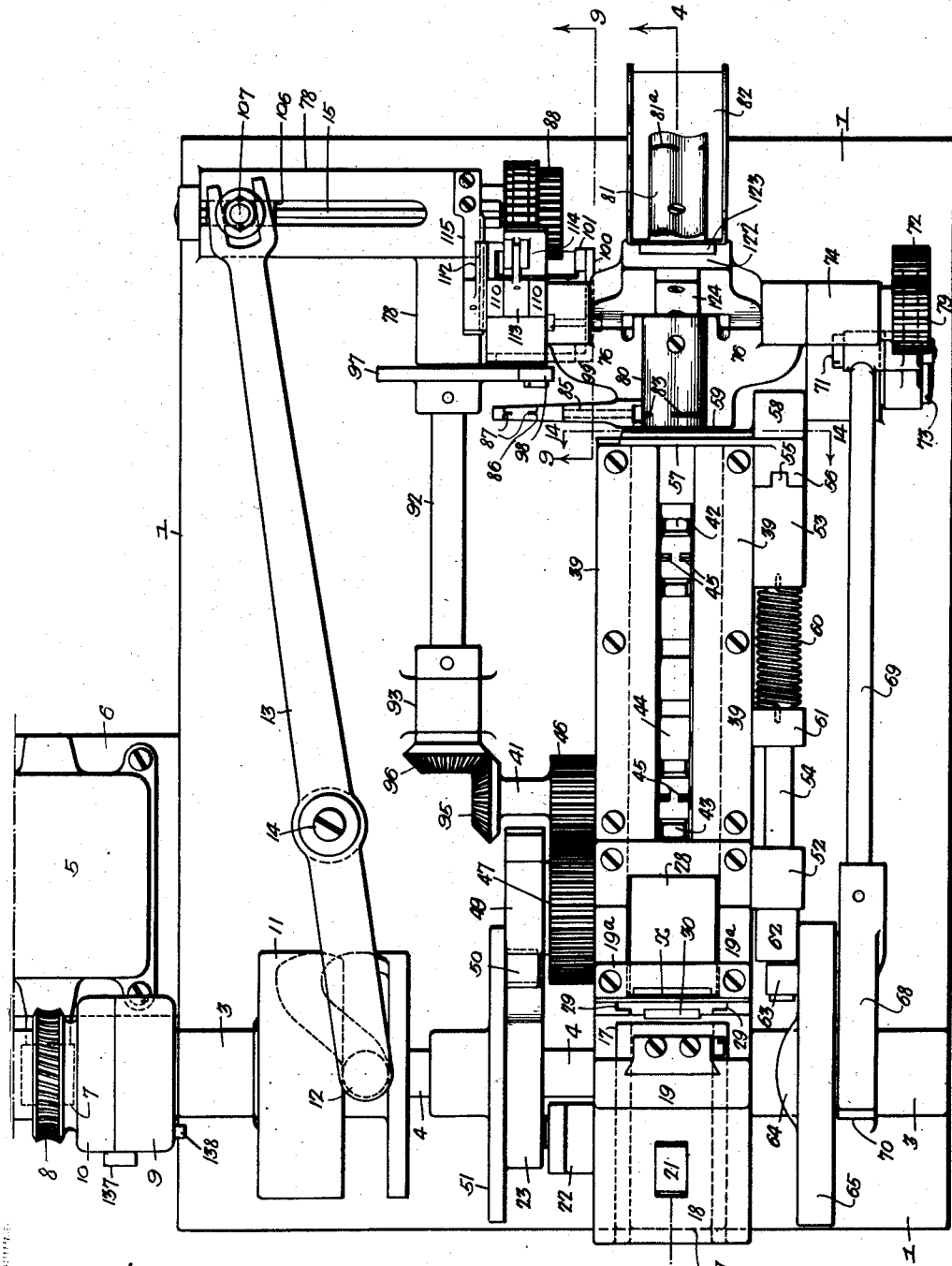

S. B. TILY AND M. O. AND J. G. REHFUSS.
TAG PRINTING AND PINNING MACHINE.
APPLICATION FILED JULY 28, 1917.
1,326,806.
Patented Dec. 30, 1919.
9 SHEETS—SHEET 3.
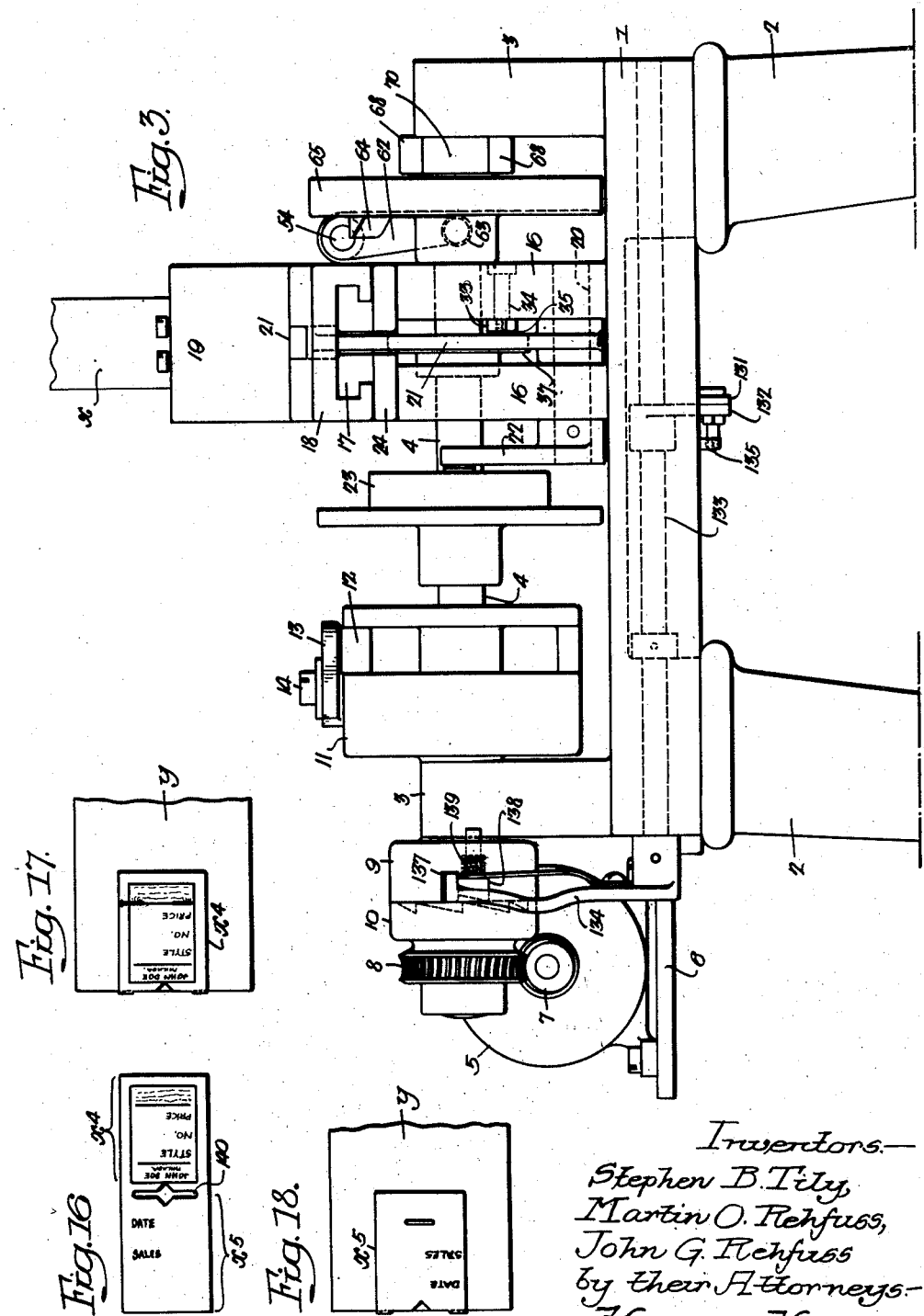

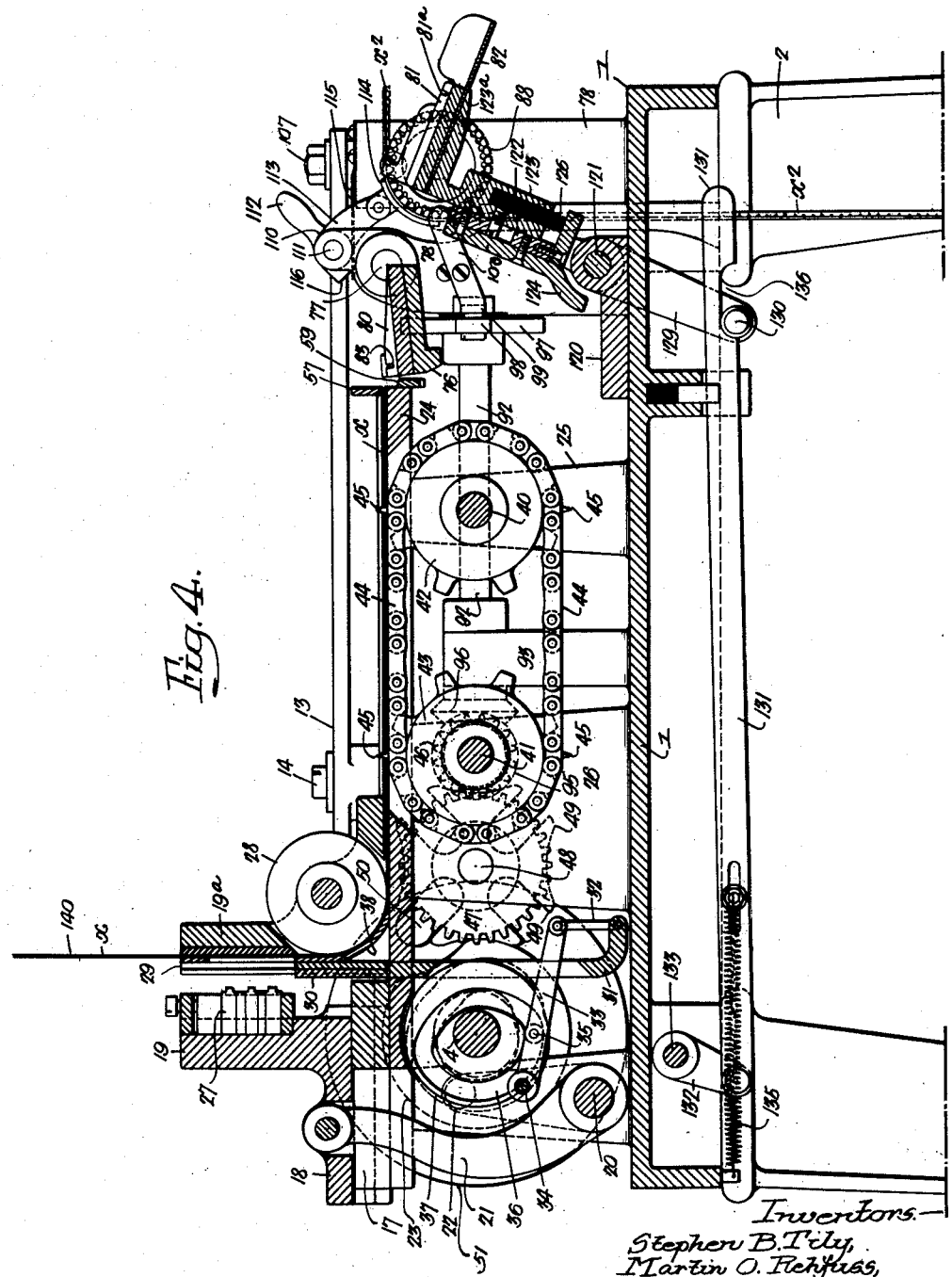

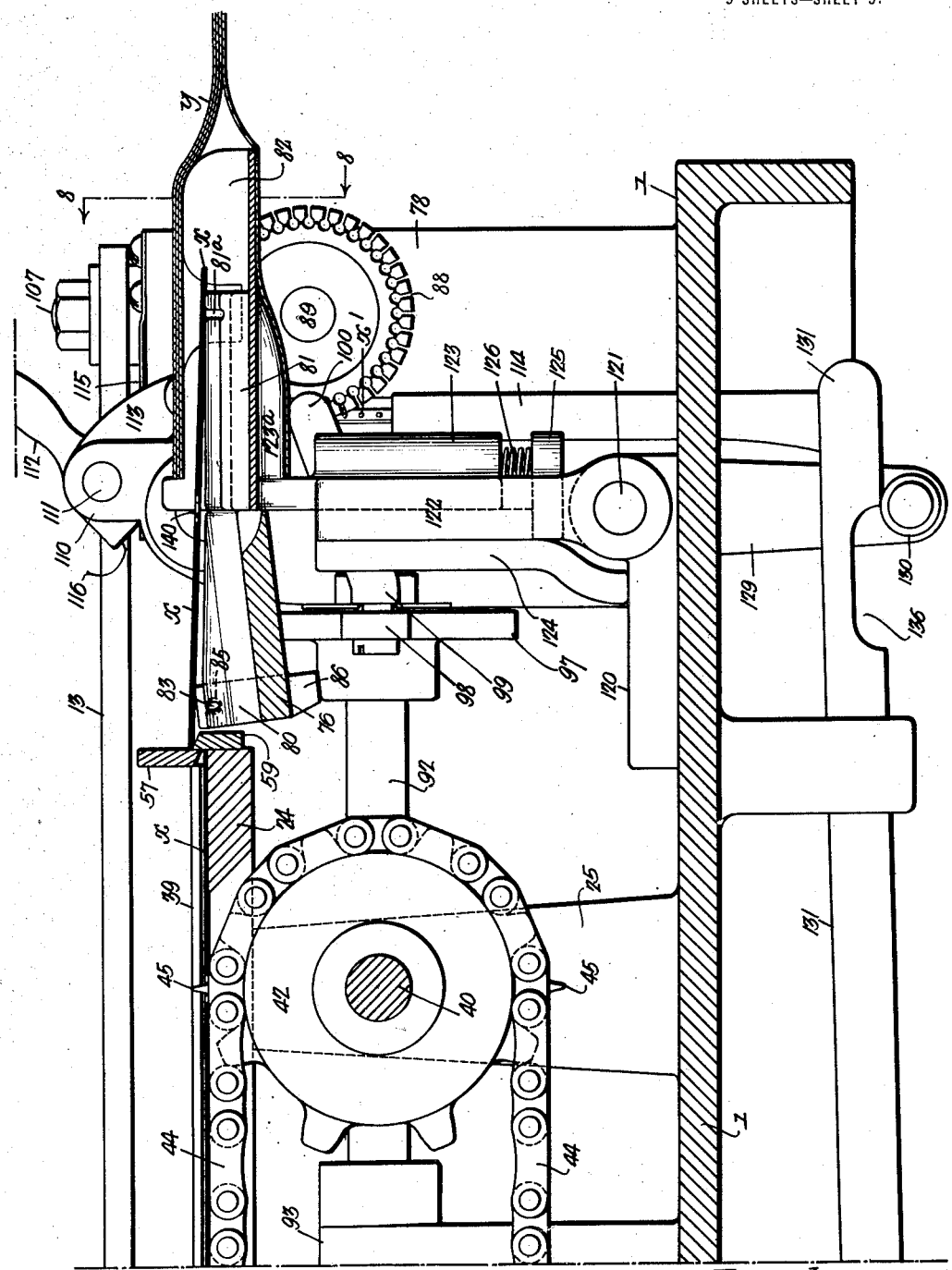

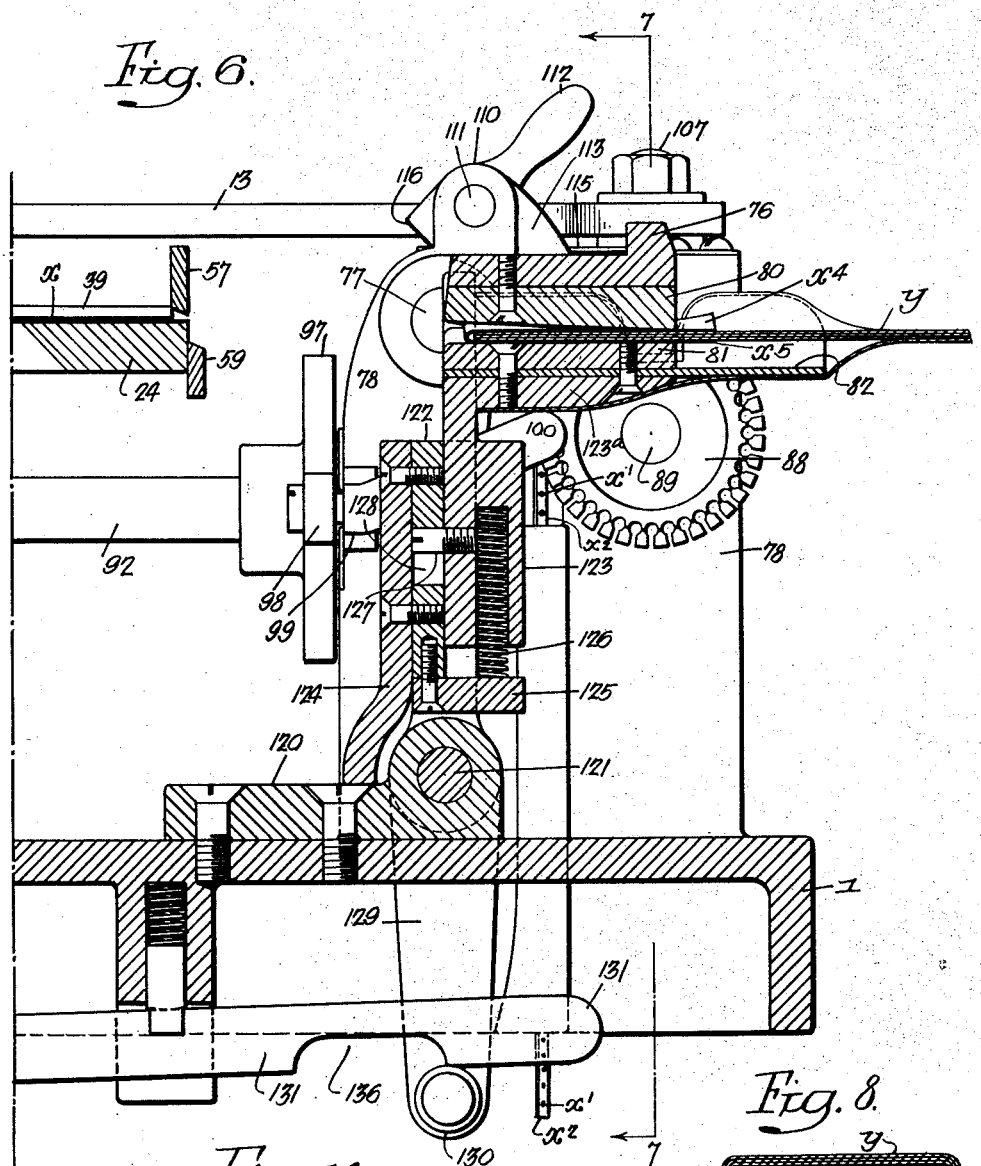

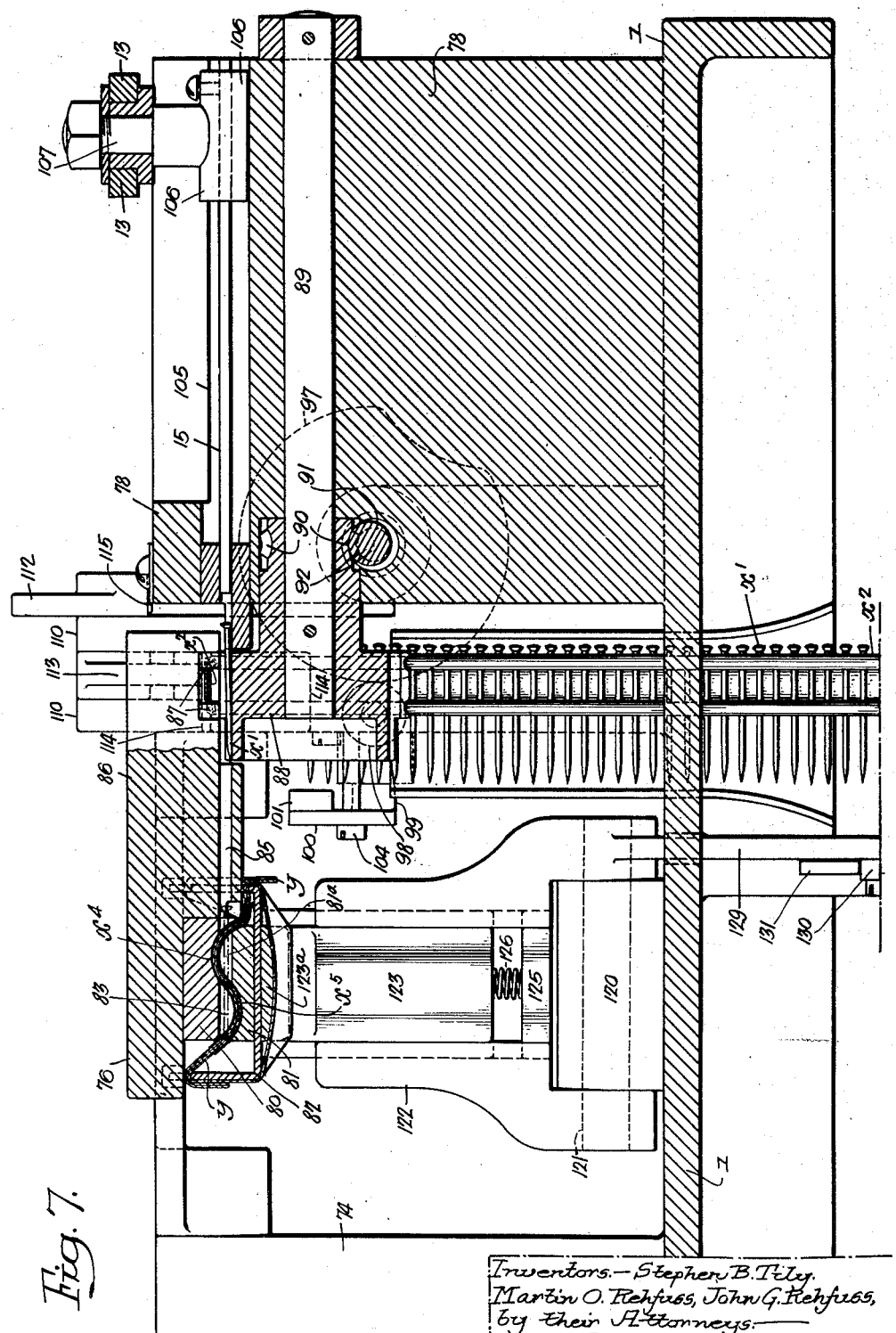

S. B. TILY AND M. O. AND J. G. REHFUSS.
TAG PRINTING AND PINNING MACHINE.
APPLICATION FILED JULY 28, 1917.
1,326,806.
Patented Dec. 30, 1919.
9 SHEETS—SHEET 8.
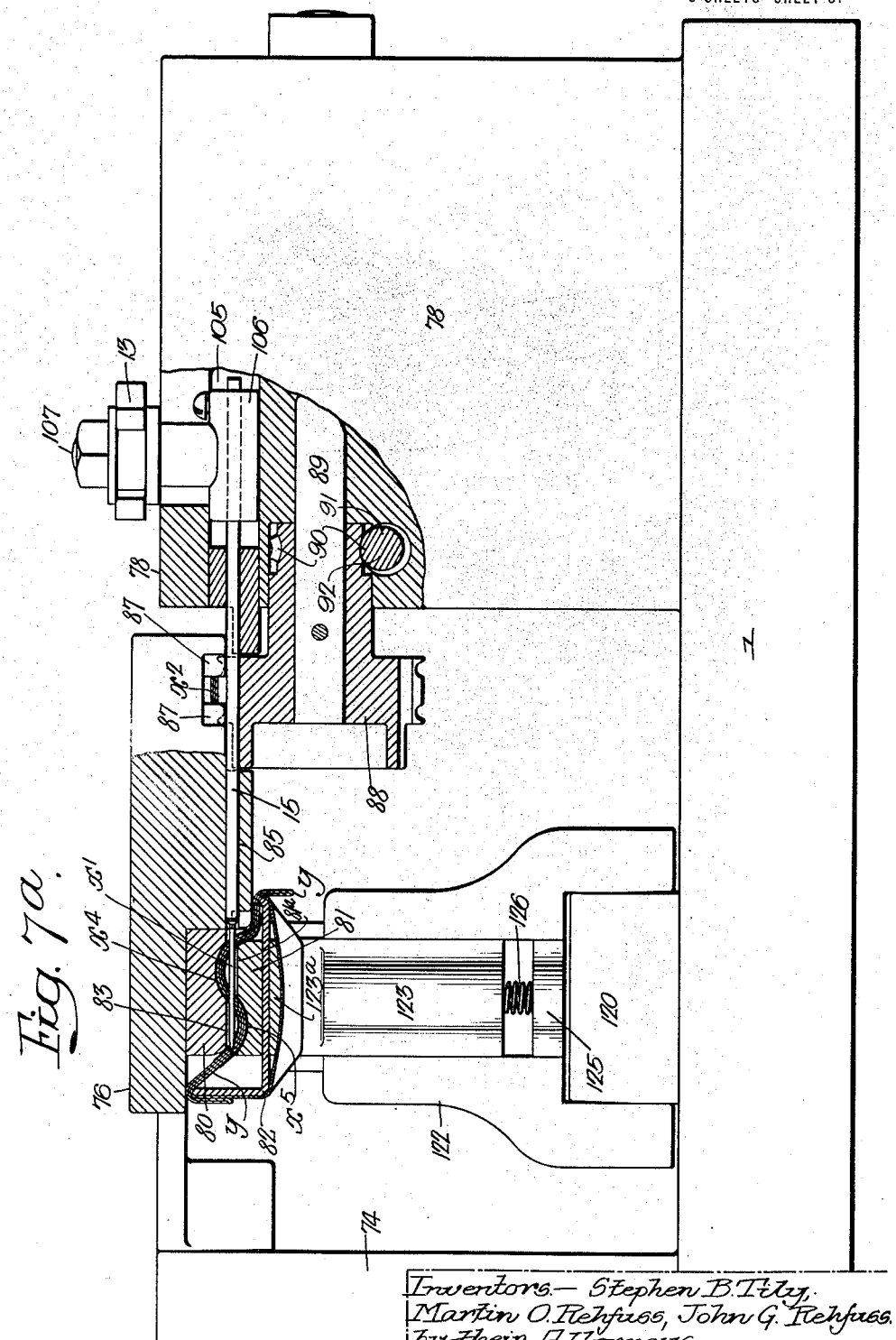

S. B. TILY AND M. O. AND J. G. REHFUSS.
TAG PRINTING AND PINNING MACHINE.
APPLICATION FILED JULY 28, 1917.
1,326,806.
Patented Dec. 30, 1919.
9 SHEETS—SHEET 9.
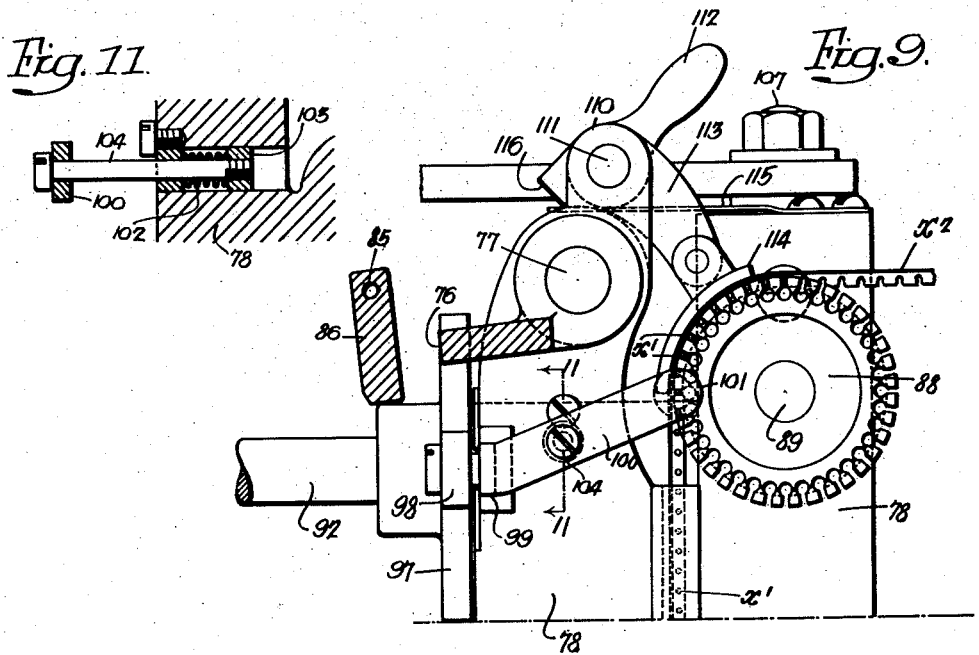
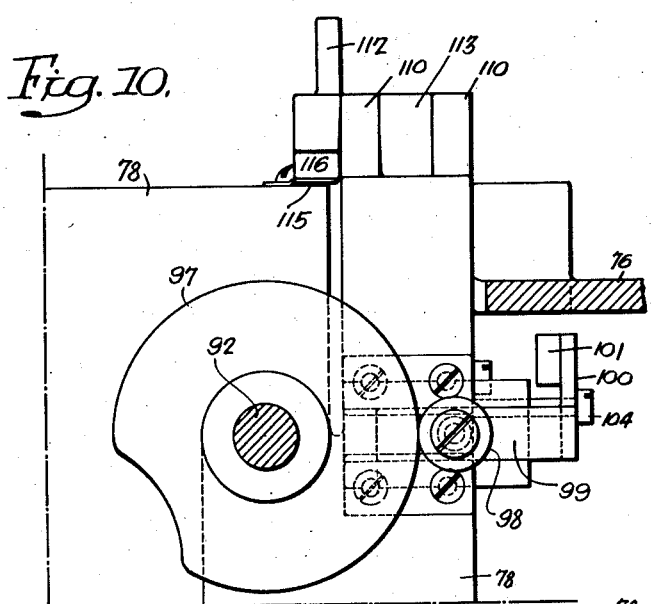
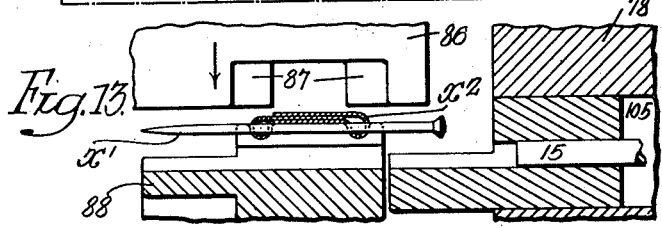
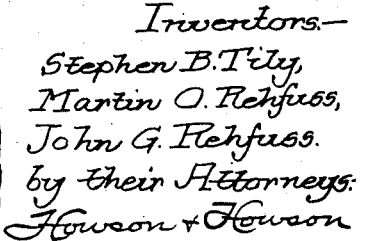
Inventors.—
Stephen B. Tily,
Martin O. Rehfuss,
John G. Rehfuss.
by their Attorneys:
Howson & Howson

UNITED STATES PATENT OFFICE.

STEPHEN B. TILY, OF BALA, AND MARTIN O. REHFUSS AND JOHN G. REHFUSS, OF PHILADELPHIA, PENNSYLVANIA, ASSIGNORS TO JOHN WANAMAKER, OF PHILADELPHIA, PENNSYLVANIA, A CORPORATION OF PENNSYLVANIA.

TAG PRINTING AND PINNING MACHINE.

1,326,806.   Specification of Letters Patent.   Patented Dec. 30, 1919.

Application filed July 28, 1917. Serial No. 183,278.

*To all whom it may concern:*

Be it known that we, STEPHEN B. TILY, MARTIN O. REHFUSS, and JOHN G. REHFUSS, citizen of the United States, I, the said STEPHEN B. TILY, being a resident of Bala, Montgomery county, State of Pennsylvania, and we, the said MARTIN O. REHFUSS and JOHN G. REHFUSS, being residents of Philadelphia, county of Philadelphia, State of Pennsylvania, have invented Tag Printing and Pinning Machines, of which the following is a specification.

One object of this invention is to provide a compact and substantial automatic machine which, after printing certain material upon a paper or similar web, severing a portion of the web from the remainder and folding it over a properly placed body of material, shall insert a pin through the latter and through both thicknesses of said severed piece, thereby firmly attaching this to said body of material.

Another object of the invention is to provide novel means for intermittently printing and feeding a paper or similar strip, together with novel means for severing predetermined lengths of the strip from the body thereof, the invention contemplating also a novel device arranged to operate in timed relation with the feeding and severing mechanism, for successively folding the severed pieces.

A further object of our invention is to provide a novel device for automatically removing the pins from a paper strip in which they are supplied and acting on them successively to force them through a plurality of thicknesses of sheet material so as to connect together certain of the elements constituting said mass.

We also desire to provide a novel combination of parts for applying to a body of fabric or other material a flat strip such as a tag or ticket, with novel means for temporarily shaping the material and the strip or tag to be applied thereto in order to permit of the mechanical insertion of a pin whereby said parts are connected together.

It is further desired to provide a novel device whereby the operation of a machine such as that above indicated shall be made to be dependent upon the movement into a predetermined position of the fabric or article holder;—the invention including a relatively simple arrangement of parts whereby the act of moving a holder from a predetermined position after an article has been applied thereto, will start or put in operation the machine for pinning a tag or ticket to said article.

These objects and other advantageous ends we secure as hereinafter set forth, reference being had to the accompanying drawings, in which, Figures 1, 2 and 3 are respectively a plan, a side and an end elevation of the machine constituting our invention;

Fig. 4 is a longitudinal, vertical section taken on the line 4—4, Fig. 1;

Figs. 5 and 6 are fragmentary vertical sections of the rear end of our machine on an enlarged scale, showing the folding apparatus in its two extreme positions respectively;

Fig. 7 is a transverse section on the line 7—7, Fig. 6;

Fig. 7ª is a section similar to Fig. 7, but showing the parts in the positions occupied when the pin has been placed in a tag and the article to which the latter was to be applied;

Fig. 8 is a transverse section on the line 8—8, Fig. 5;

Fig. 9 is a vertical section on the line 9—9, Fig. 1;

Fig. 10 is a side elevation, partly in vertical section, illustrating certain of the structures shown in Fig. 9;

Fig. 11 is a fragmentary section on the line 11—11, Fig. 9;

Fig. 12 is a fragmentary front elevation, on an enlarged scale, illustrating the slotted drum for supporting the paper strip in which the pins are carried, showing in section the adjacent pin displacing plunger;

Fig. 13 is a fragmentary vertical section, also on an enlarged scale, illustrating the detail construction of certain of the parts of the pin supporting and inserting mechanism;

Fig. 14 is an elevation of the strip severing knife;

Fig. 15 is a plan of a part of the strip or paper web after it has been printed, but before its application to the fabric or other article to be tagged;

Fig. 16 is a plan of a single ticket or tag after it has been cut from the printed strip; and Figs. 17 and 18 are plans showing the two faces of a body of material with a ticket or tag applied thereto.

In Figs. 1 to 3 inclusive of the above drawings, 1 represents a supporting base carried on legs or standards 2 and consisting of a relatively heavy casting provided with bearings 3 for a main shaft 4. This latter is driven from any suitable source of power, shown in the present instance as an electric motor 5 carried on a bracket 6 at one side of the base 1, and having fixed to its armature shaft a worm 7, meshing with a worm wheel 8 loose on the shaft 4. The latter has fixed to it one member 9 of a toothed clutch whose second member 10 is integral with or connected to the worm wheel 8. Fixed to the shaft 4 between the bearings 3 is a cam 11 having a groove in which is operative a roller 12 on one end of a lever 13. This latter is pivoted by a screw 14 to a suitable vertically extending bracket projecting up from the base 1 and is designed to reciprocate a plunger 15 as hereafter described.

Mounted on the base 1 to the rear of the shaft 4 are a pair of vertically extending standards 16 connected by and supporting at their tops a horizontally extending guide 17, (Figs. 3 and 4) which is undercut to serve for the reception of a reciprocable slide 18 supporting or constituting a part of a type carrying head 19. For moving this slide with the head on said guide, we provide a third shaft or spindle 20 journaled in the lower portions of the standards 16 and connected to the slide through an arm 21 (Fig. 4). A second arm 22 pinned to the spindle 20 is caused to oscillate the latter and reciprocate the slide 18, by means of a cam 23 fixed in any suitable manner to the shaft 4. As shown in Fig. 4, the guide 17 is fixed to or formed as part of a table structure 24 carried at one end upon the standards 16 and at the opposite end supported by a second pair of standards 25, there being also a third or intermediate pair of supporting standards 26, formed integral with or otherwise rigidly supported by the base structure 1.

On this table structure 24, immediately in front of the slide 18 is fixed a strip guiding structure 19ª constituting also an abutment or platen for the type 27 carried by the head 19 and having journaled in it a roller 28, (Fig. 4) whereby the paper or strip has its direction of movement changed from vertical to horizontal. The face of this platen 19ª adjacent the head 19 is formed with vertical guide 29 in which is vertically slidable any suitable form of ink carrying device such as a pad 30 so arranged that it may be intermittently moved between the main portion of the platen structure 19ª and the type or lowered into the position shown in Fig. 4. For actuating this carrying member, it has connected to it a downwardly extending arm 31 connected through a link 32 to an arm 33 pivoted to one of the standards 16 at 34 and having a roller 35 operative in a groove or channel 36 of a cam 37 fixed to the main shaft 4 between the two standards 16.

The strip guiding roller 28 is so placed as to receive a continuous web or strip of relatively stiff paper or cardboard as it moves vertically downward and after directing it past the front of the type 27, deliver it to the guide wheel 28 which in combination with a curved guide 38, changes its direction so that it runs parallel with and immediately adjacent the level of the top of the table 24.

As shown in Figs. 1, 4 and 14, the top of said table has mounted on its opposite longitudinal sides, undercut guide plates 39 which are removably held in place by screws (Fig. 1) and for positively moving the strip *x* through the guideway thus provided, we mount in the standards 25 and 26 respectively, a pair of short horizontal shafts 40 and 41, respectively carrying two sprocket wheels 42 and 43. These wheels are connected by a sprocket chain 44 provided with pins 45 projecting outwardly from certain of its links and the shafts 40 and 41 with said sprocket wheels 42 and 43 are so placed that the top run of this chain has its upper surface substantially flush with the top surface of the table 24 so that the pins 45 will engage a strip which extends between the guide plates 39.

For driving the sprocket chain and therefore propelling the strip engaged by its pins 45, we fix to the shaft 41 a small gear 46 driven by a second gear 47 mounted on a stud or short spindle 48 supported by one of the standards 26. This spindle also has fixed to it one member 49 of a Geneva gear formed to coöperate with a second properly formed gear member provided by the periphery of the cam structure 23 and by a pin 50 carried by a disk 51, shown as integral with said cam 23. As the shaft 4 is continuously turned, it will be evident that through the Geneva gear, the gear 47 and hence the pinion 46 will be intermittently actuated, as will also the chain 44 and strip feeding pins carried thereby.

From Figs. 1 and 14, it will be seen that along one side of the table 24, we provide a pair of projecting bearings 52 and 53 in which is rotatably mounted a horizontal shaft 54 extending parallel with said table, and form one end of the bearing 53 with a pair of oppositely placed teeth 55 designed to fit into corresponding recesses in a hub 56 belonging to or forming part of a knife or shear blade 57 extending over and slightly above the rear or outer end of the table 24. The rear end of the shaft 54 has fixed to it a second hub 58 carrying the second shear blade 59 which as illustrated in Figs. 6 and 14, has its cutting edge normally below the rear edge of the table 24 in position to cooperate with the lower edge of the shear blade 57 to sever from the main portion thereof that part of a strip of material which projects rearwardly beyond said table edge.

The movable shear blade 59 is normally retained in its open or lowered position (Fig. 14), by a spring 60 coiled around the shaft 54 and having one end fixed to the bearing 53, while its other end is fixed to a collar 61 in turn pinned or otherwise rigidly held to said shaft. For actuating this latter we mount on its forward end a downwardly projecting arm 62 on whose lower end is mounted a roller 63 designed to cooperate with or be acted on by a side projection 64 on the cam disk 65 which is fixed to the shaft 4 adjacent one side of the machine and the arrangement is such that once in each revolution of the latter shaft said roller 63 is engaged and the shaft 54 is turned in one direction through an angle sufficient to cause the shear blade 59 to swing up and sever a strip projecting between it and the upper shear blade 57.

The cam disk 65 (Fig. 2) has in its outer face a cam groove 66 designed for the reception of a roller 67 carried by the forked end 68 of a rod 69;—the branches of said end extending on opposite sides of a block loosely mounted on the shaft 4 so as to be supported and guided thereby (Figs. 1 and 3). The opposite end of the rod 69 is connected by a pin 71 (Figs. 1 and 2) to a toothed segment 72 pivotally supported by a screw 73 upon a bracket or standard 74 projecting upwardly from the base 1 and at its upper end also providing a bearing for the shaft or trunnion 75 of an oscillatory yoke 76. The opposite end of this latter is likewise provided with a trunnion 77 (Fig. 9) operative in a bearing formed at the top of a second bracket or standard 78 at the opposite side of the machine, and the trunnion 75 has fixed to it a spur gear 79 engaged by the teeth of the segment 72;—the arrangement of the parts being such that the reciprocation of the rod 69 by the rotation of the cam disk 65 oscillates the toothed segment 72 through such an angle as to turn said spur gear 79 and hence the yoke structure 76 through an angle of substantially 180°, from the position shown in Fig. 5 to that shown in Fig. 6.

As shown in Figs. 1, 5 and 7, the yoke structure 76 has rigidly fixed to what is normally its upper face, a plate 80 of generally wedge shaped section and such length that when the machine is at rest ready for operation, its forward end extends immediately adjacent the shear blade 59 and its top face (Fig. 7) is formed to have one longitudinally extending corrugation, i. e., approximately half of said face is longitudinally convex while the other half is longitudinally concave, being complementary to a second plate 81 and mounted longitudinally of a shallow trough 82 hereafter described.

Said first plate 80, at a point near its forward end, has a straight, transverse, pin-receiving or guiding passage 83 constituting a continuation of a guiding passage 85 extending longitudinally through an arm 86 which projects laterally from the plate 80, and is carried by or forms part of the yoke 76, Figs. 1 and 7. It is noted that what is normally the upper portion of the outer end of this arm is cut away (Figs. 1, 12 and 13), to provide a pair of teeth 87 which when the yoke 76 is swung through an arc of 180°, are designed to engage a pin $x'$ and force it out of the paper strip $x^2$ in which it is carried, down between the teeth of a conveying wheel 88.

The pin carrying wheel 88 is mounted on a spindle 89 journaled in the bracket or standard 78 (Figs. 9, 12 and 13) and has one part of its periphery of greater diameter than the other, being transversely slotted to provide a series of recesses which in the portion of greater diameter, have relatively narrow entrances, although in the part of smaller diameter they are relatively wide, (Figs. 12 and 13).

The hub of the wheel 88 is extended into the bearing structure 78 (Fig. 7) and is cut to constitute a worm wheel 90 engaged by a worm 91 formed on or connected to a shaft 92 supported partly in a bearing in the standard 78 and partly by a second bearing in a bracket 93, Fig. 1. Said shaft is intermittently turned from the shaft 4 through the Geneva gear 23—49, the gears 47 and 46, the shaft 41 on which the latter of said gears is mounted, and a pair of beveled gears 95 and 96, of which the latter is fixed to the shaft 92.

As shown in Figs. 7 and 9, the toothed wheel 88 is formed with two circumferential grooves to receive the longitudinal ribs or corrugations of the paper or strip in which ordinary headed pins $x'$ are carried in the well known manner and in order that the projecting pointed ends of these pins shall not be struck by the arm 86 when this is turned from its normal to its operating position, (Fig. 7), we find it desirable to move said pins longitudinally in said strip before they have been brought to such an interfering position. For this purpose, we fix to the shaft 92 a cam wheel 97 (Figs. 7 and 10) in position to periodically actuate a roller 98 fixed to a slide 99 carried in a guideway provided by the bracket or bearing structure 78 so as to move this horizontally.

Said slide 99 carries an arm 100 which at one end has a head 101 so placed as to engage the point of a pin projecting beyond the adjacent overhanging edge of the wheel 88 and force it back flush or coincident with said edge, and while the parts are so arranged that the cam 97 normally holds the slide 99 and the arm 100 away from said wheel 88, said arm at all times tends to move its roller 98 toward said cam and its head toward the pin-carrying wheel under the action of a spring 102 operative within a recess of the bracket 78 upon a nut 103 on one end of a bolt 104 connected to said arm.

For forcing the pins out of the carrying wheel 88 into the passage 85 of the yoke-carried arm 86, through the body of material and the tag or ticket to be fastened thereon, we provide the top of the bracket 78 with a guideway 105, in which is mounted a reciprocable slide 106 (Fig. 7). This slide has projecting from it within the guideway the plunger 15 and also includes an upwardly projecting stud 107 on which is operative the forked end of the lever 13, (Figs. 1 and 7). As said lever is oscillated by the cam structure 11, the rod or plunger 15 is reciprocated through one of the slots or recesses of the pin-carrying wheel 88 and the passage 85 of the arm 86.

The standard 78 has projecting upwardly from it above that one of the yoke trunnion bearings adjacent the pin wheel 88 (Fig. 9), a pair of lugs 110 providing bearings for a short spindle or pin 111, on which are fixed two arms 112 and 113. The first of these extends up so as to serve as a handle and the other has loosely pivoted to its downwardly extending end a circularly curved retaining plate 114 designed to fit around the curved surface of the wheel 88 so as to retain in proper position thereon the pin carrying paper strip $x^2$. Said handle 112 has its lower end formed with two faces at an angle to each other and so placed that either of them may engage a flat spring 115. This is so mounted that when in engagement with one of said faces it holds the arm 113 and the retaining plate 114 in the positions shown in Fig. 9. Whenever the handle 112 is moved to a position in which the spring engages the second flat face 116, the arm 113 and the plate 114 are held in a raised position away from the surface of the wheel 88 so as to permit of the placing thereon of the pin carrying band or strip of paper.

We also mount or form on the base 1 under the yoke plate 76, a plate structure 120, Fig. 4, designed to provide a bearing for a spindle 121 on whose opposite ends are mounted the branches of a forked block 122, Figs. 4, 5 and 7, said block is formed to provide a vertical guideway for a slide 123 and has also fixed to it a downwardly projecting arm 124, whose lower end by engaging the plate structure 120 serves to prevent the block from swinging forward beyond a substantially perpendicular position.

As shown in Fig. 6, the block 122 has projecting from its lower portion a finger 125 designed to be engaged by a spring 126 extending into the slide 123 and has a limited vertical movement in the undercut guideway of the block 122 which movement however, is positively limited by a pin 127 screwed into said slide and extending into a slot 128 in said block.

The upper end of the slide 123 has a portion $123^a$ projecting rearwardly at right angles to its general length and to this the open ended trough or box 82 is held by screws which pass through it into the corrugated bottom plate 81. This trough or box, in addition to being open at the ends, is open at the top for the reception of the clamping or holding plate 80 of the yoke 76.

The main part of the block 122 has projecting down from one of its branches an arm 129, (Figs. 6 and 7) which at its lower end carries a roller 130 supporting and coöperating with the end of a longitudinally movable bar 131, Figs. 3, 4 and 6. Said bar extends from front to rear of the machine and its forward end is attached to the lower end of an arm 132 fixed to a shaft 133 extending transversely of the forward end of the machine and also having fixed to it an upwardly projecting arm 134 extending adjacent the clutch members 9 and 10. Said bar 131 at all times tends to move toward the forward end of the machine under the action of a spring 135, and the under edge of its rear end, (Figs. 5 and 6) is provided with an elongated recess 136 into which the roller 130 may enter under certain conditions.

From Figs. 1, 2 and 3, it will be noted that the arm 134 is laterally bent or curved and has an overhung end 137 designed to normally hold the outwardly projecting end of a tooth or bolt 138 so that it is clear of the teeth of the driving member 10. Said bolt or tooth is slidably mounted in the clutch member 9 and is at all times pressed toward said member by a spring 139. When however the arm 134 is swung outwardly so as to clear this projecting portion of the bolt 138, the latter is forced by said spring 139 toward the clutch member 10, so that it engages one of the teeth thereof and couples it to the clutch member 9 which with its attached shaft is then caused to make one complete revolution. As it nears the end of such revolution, the bolt 138 engages the curved portion of the arm 134 which forces it out of engagement with the tooth of the member 10 and ultimately brings it to rest by means of its end 137.

With the above described arrangement of parts, a strip $x$ of paper, fabric or cardboard suitable for use in making tags and having transverse slots 140 cut in it at definite intervals, is delivered to the machine in the guideway of the platen 19$^a$ and after being carried around the roller 28, is run into the guides of the table 24. The type 27 in the head 19 is set up to print the date, sales number, etc., etc., and the pad or inking device 30 is provided with the necessary ink for supplying said type; the arrangement of parts being such that the cam 23 causes the head 19 to move toward the structure 19$^a$ each time the ink pad 30 is raised, thereby inking the type.

One end of a strip of paper $x^2$ formed with two longitudinal ribs through which the pins $x'$ are stuck, is then placed around the pin-carrying wheel 88, for which purpose the handle 112 is swung forwardly to move the retaining plate 114 away from said wheel. After the paper strip with the pins has been properly inserted as shown in Fig. 9 so that the ribs of said strip rest in the grooves of the wheel 88, said handle is returned to its normal position with the plate 114 in position to hold the pin-carrying strip in place with the points of its row of pins extending toward the arm 100, beyond the face of said carrying wheel. The article of commerce to be tagged, such as a pair of stockings $y$ is then placed over the trough or box 82 while this is in the position shown in Fig. 4, and in the case illustrated, the double thickness of the upper end of one of the pair of stockings and the single thickness of the upper end of the second of such stockings is passed over the top of said trough 82 while the single thickness of the second pair of said pair of stockings is passed under the trough, (Figs. 6 and 8).

With the parts in the positions shown in Fig. 4, it is noted that the roller 130 of the arm 129 is at the forward end of the recess 136 in the bar 131, so that when the operator, by swinging the trough with its slide 123 and block 122 into the perpendicular position shown in Fig. 5, causes said arm 129 to move to the rear, the roller thereon engages the rear end of said recess and moves the bar 131 toward the rear, finally riding out of the recess into the position shown in Fig. 5 and permitting said bar to return to its normal position under the action of its spring 135.

The rearward movement of the bar however, through the arm 132 and shaft 133, swings the arm 134 outwardly from the clutch member 9 so that its head 137 clears the bolt 138 and permits it to move into engagement with one of the teeth of the clutch member 10 as above described. Said two clutch members are thus operatively coupled and the subsequent return of the bar 131 to its normal position allows the arm 134 to also return to a position ready to disengage the bolt 138 from the clutch member 10 upon the completion of one revolution of the shaft 4.

Such revolution of the shaft 4 through the cam 23, arm 22, shaft 20, and arm 21, moves the slide 18 with its head 19 toward the platen 19$^a$, thereby causing the type 27 to make an impression upon the tag strip $x$ after which the latter is fed forward a distance equal to the distance between two successive slots 140, through the agency of the Geneva gear 23—49, the gears 47 and 46, shaft 41 and sprocket wheel 43. Said wheel moves the chain 44 with its pins 45 which project into said slots in the tag strip and therefore feed the same. Said strip as delivered to the machine has the appearance illustrated in Fig. 15, being printed with the words "Date" and "Sale" on one side of each slot 140 and with a ticket form on the opposite side thereof. The operation of the printing mechanism above described causes the insertion of symbols or numerals giving the style, price, etc.

In starting the machine, it is necessary to repeatedly swing the trough 82 with the block 122 toward and from its vertical position, until the end of the tag strip is fed rearwardly between the shear blades 57 and 59, over the yoke 76 and its plate 80 on to the plate 81. The mechanism of the machine is so timed that after such feeding has occurred, the rotation of the cam 65 causes its projection 64 to act on the roller 63 of the arm 62 in such manner as to partially turn the shaft 54 and swing upwardly the lower shear blade 59, which thereupon coöperates with the upper blade 57 to sever the rearwardly projecting and printed end of the tag strip. The severed length of the strip then occupies the position relatively to the adjacent elements, shown in Fig. 5, with its transverse slot 140 lying immediately across the line of contact of the two plates 80 and 81, its tag printed face $x^4$ being turned down immediately adjacent the upper surface of the plate 80 and its comparatively blank portion $x^5$ extending within the lower or second of the stockings $y$ which is stretched over the trough structure 82.

Immediately after the operation of the knife 59, the cam 65 acts upon the roller 67 to move the rod 69 in the direction of the arrow, Fig. 2, with the result that the toothed segment 72 is swung on its pivot 73 and causes the pinion 79 with the trunnion 75 and yoke 76 to swing through an angle of 180° from the position shown in Fig. 5, to the position shown in Fig. 6. As a result of this operation the yoke with the plate 80 bends the adjacent part of the tag $x$ on a transverse line extending through its slot 140 and turns it over into close contact with the top face of the stocking, thereafter forcing this down in the trough until it as well as both thicknesses of the tag are compelled to assume the corrugated or ridged form shown in Fig. 7. This turning over of the yoke 76 and plate 80 brings the arm 86 over the pin carrying wheel 88 and forces its teeth 87 down onto the pin in the topmost part of the paper strip $x^2$ (Figs. 12 and 13), causing said pin to break through the ribbed portions of said strip and enter the enlarged portion of the adjacent slot in said wheel. Immediately thereafter the cam 11 operates the lever 13 to move the plunger 15 toward the pin carrying wheel 88 so that it engages the pin just deposited in the large part of the topmost slot and moves it longitudinally through the passage 85 (Fig. 7) of the arm 86, then through the passage 83 of the plate 80, into the passage $81^a$ in the plate 81, which as shown in Fig. 7, is in line therewith.

In so doing said pin is caused to pass twice through both thicknesses of the tag, through the layers of the stockings between the same, and to be left with its point embedded in or completely covered by one or more thicknesses of the stocking, after which the plunger 15 is withdrawn. The pin point is thus guarded or concealed so that it is not exposed and likely to scratch anyone handling the goods. The cam 65 thereupon moves the rod 69 in a direction opposite that of the arrow, Fig. 2, causing the yoke 76 to be swung back into the position shown in Fig. 4, and allowing the operator to move the trough 82 with its attached parts back to the position shown in Fig. 2. The stockings or other goods with the tag attached as shown in Fig. 17, is thereupon removed.

The succeeding operation of the Geneva gear 23, 50, 49, not only so turns the shaft 92 as to move the pin carrying wheel 88 through the worm 91 and worm wheel 90 to an extent equal to the distance between two adjacent pin slots, but through the cam 97 and roller 98, also causes the head 101 of the arm 100 to move toward the adjacent face of the pin carrying wheel 88. Said head thus forces one of the projecting pins backwardly in its supporting web or strip $x^2$ until its point is substantially flush with the adjacent face of said wheel, and makes it possible for the latter to carry the previously moved pins into line with the plunger 15 and passage 85 without interfering with the arm 86.

After another pair of stockings or other articles has been placed over the trough 82 and plate 81, it with the member 122 and the attached parts may be again swung from the position shown in Fig. 4 into the position shown in Fig. 5, thereby again causing the clutch members 9 and 10 to be coupled as previously described and begin another series of operations.

From the above description it will be understood that we are enabled to quickly and conveniently print and affix tags to an article, using for this purpose pins of the well known form, which may be conveniently removed when it is desired to separate the tag from said article. By connecting the trough or equivalent article-carrying structure and the clutch as shown, the machine is not and cannot be started until said structure is in the proper position to receive a tag and fold it over the article.

Obviously the machine may be utilized to insert a succession of pins in one or more bodies of material without being compelled to affix tags.

While we have used the terms "corrugated" or "corrugation" to indicate the contour or form of the faces 81 and 80 of the holder and folder respectively, it is to be understood that such nomenclature is intended to include any arrangement of parts equivalent to that shown, whereby the material to be tagged and either one or both folds of the tag will have portions displaced from their original positions in order that the pin may pass repeatedly through said material and the tag when moved by the plunger in a line substantially parallel to the general nominal plane of the material and tag.

We claim:—

1. The combination of means for feeding a strip; means for cutting a succession of lengths from said strip; means for successively folding said lengths upon themselves; and a device for inserting a pin in a line substantially parallel with that of said folded lengths transversely of each length through both of the folds thereof.

2. The combination of means for supporting a body of material; means for feeding a strip adjacent said body; and means for inserting a straight pin through the body of material and the strip in a line substantially parallel to the plane of said body.

3. The combination of means for supporting a body of material; means for placing two folds of a strip respectively on opposite sides of said body; and means for inserting a pin in a line substantially parallel to the plane of said body through the body of material and the strip.

4. The combination of means for supporting a body of material to be tagged; means for feeding a piece of strip material on one side of said body; a device for turning a portion of said piece over the opposite side of the body of material; and means for inserting a pin in a line substantially parallel to the plane of said body through said body and through both thicknesses of the piece of strip material.

5. The combination of means for supporting a body of material; means for feeding a strip adjacent said body; a device for folding the strip over the body; and mechanism for inserting a straight pin into the strip and through the body of material.

6. The combination of means for supporting a body of material; means for automatically delivering a strip adjacent said body; mechanism for giving said strip and body of material a corrugated form; means for inserting a pin through the strip and the body of material transversely of the corrugation thereof.

7. The combination of means for supporting a body of material; means for folding a strip over opposite faces of said body; mechanism for giving the material and the two parts of the strip a corrugated form; and a device for inserting a pin through the two layers of the material and the strip transversely of the corrugations thereof.

8. The combination of means for supporting a body of material; means for delivering a part of a piece of strip material adjacent one face of said body; mechanism for folding the remainder of said strip material over the opposite faces of said material; means for temporarily corrugating the body of material and parts of the strip material adjacent the same; and a device for inserting a pin through the corrugations of said material and the strip.

9. The combination of a holder for a body of material to be tagged; a rotatable folder adjacent thereto formed to clamp said material and a tag against said holder; and means for inserting a pin through the material and the tag while they are so clamped.

10. The combination of a holder for material to be tagged; a rotary folding-plate adjacent thereto; mechanism for periodically moving said plate into a position to clamp the material against the holder; with a device for inserting a pin through the material in a line parallel with the plane thereof while it is so clamped.

11. The combination of a holder for material; a rotary folding-plate; means for feeding a tag onto said plate; means for turning the plate to clamp the tag and the material against the holder; and means for inserting a pin through the tag and the material in a line substantially parallel with the plane of the tag while they are so clamped.

12. The combination of a holder for material to be tagged; a rotary folding-plate mounted adjacent thereto; means for feeding a strip of tag material onto said plate; means for cutting off a length of said strip to form a tag; means for moving the plate to fold said tag upon the material on the holder and corrugate both tag and material; and means for passing a connecting element through the corrugations of the material and the two folds of the tag.

13. The combination of a rotary folding-plate; means for delivering a tag thereto; an oscillatory holder for material, mounted to swing toward and from said folding-plate; means for turning the plate into position to clamp the tag upon the material on the holder when the latter is in a predetermined position; and means for connecting the tag and the material after these have been clamped.

14. The combination of a holder for material; a structure movably supporting said holder; a folder for a tag; means for actuating said folder to clamp the tag upon the material on the holder; and a controlling device for said actuating means governed by the holder.

15. The combination of a holder for material; a rotary tag-folding plate; means for actuating said plate to place a tag upon the material on the holder; means for giving the tag and the material a corrugated form when these are adjacent each other; and means for inserting a fastening device through at least one of the corrugations of the tag and the material.

16. The combination of a holder for material, having a corrugated surface; a tag-folding plate also having a corrugated surface complementary to that of the holder; means for turning the clamping plate into position to cause a tag to be placed adjacent a body of material on the holder; and means for inserting a fastening device through at least one of the corrugations of the tag and material.

17. The combination of a holder for material to be tagged, having a corrugated surface; a tag folding plate also having a corrugated surface complementary to that of the holder; means for turning the clamping plate into position to cause a tag to be placed upon a body of material on the holder; and means for inserting a pin through at least one of the corrugations of the material and tag when these are adjacent.

18. The combination of a holder for material; a folding plate mounted adjacent thereto; means for delivering a tag into a position over both the holder and the plate; means for swinging said plate through substantially 180° to bring a portion of the tag down upon the material on the holder; with mechanism controlled by said holder for governing the operation of said plate.

19. The combination of a trough-shaped holder for material to be tagged; means for delivering one end of a tag adjacent one face of a body of material mounted over said trough; means for folding the remainder of the tag into a position adjacent the other face of said material; and means for inserting a fastener through said material and tag in a line substantially parallel to the planes thereof after they have been so positioned.

20. The combination of a holder for material to be tagged; a member for clamping a tag upon the material on said holder; and means for inserting a pin through the material and the tag in a line parallel to the plane of the latter while these are clamped together.

21. The combination of a holder for material to be tagged, having a corrugated face; a movable clamping member having a face complementary to that of said holder; means for moving said member toward and from the holder to alternately clamp a body of material and a tag against the holder; with mechanism for inserting a pin through the tag and material while these are held in corrugated form by said parts.

22. The combination of a holder for material to be tagged, having a corrugated face provided with a transverse channel; a tag clamping member having a corrugated face complementary to that of the holder; and means for inserting a pin through the passage of the holder and through the material and tag while these are clamped together.

23. The combination of a holder for material, having a corrugated face provided with a transverse channel; a tag clamping member having a corrugated face complementary to that of the holder; and means for inserting a pin through the passage of the holder to connect the material and tag while these are clamped together, the same consisting of a pin carrier and a plunger for transferring pins from said carrier to said passage.

24. The combination of a holder for material, having a face of a contour other than plane, a clamping member having a face complementary to that of the holder; means for actuating the clamping member to cause it to coöperate with the holder to make portions of a body of material and of a tag adjacent thereto project beyond their normal planes; with means for inserting a pin through such projecting portions to connect together said parts.

25. The combination of a holder for material; a structure movably supporting said holder; a member for clamping a tag and a body of material upon said holder; means for actuating said clamping member including a source of power and a clutch; and means connected to the structure supporting the holder for controlling the clutch.

26. The combination of an oscillatory structure; a holder for material, mounted thereon; a member for clamping a tag to a body of material on said holder; means for actuating said clamping member including a clutch having a controlling pin; means for connecting said pin with the oscillatory structure and arranged to cause transmission of power through the clutch when the holder is moved into a predetermined position.

27. The combination of a supporting structure; a holder yieldingly mounted on said structure; a member for clamping a tag to a body of material on the holder; and means for inserting a pin through the tag and said material in a line substantially parallel to the planes thereof when they have been clamped together.

28. The combination of a frame; a structure pivoted thereto so as to be free to oscillate; a holder for material mounted on said structure; a stop to limit movement of the structure in one direction; a clamping member; means for moving said member to cause it to clamp a body of material and a tag against said holder when the latter has been moved into the position determined by said stop; and means for fastening together the tag and material so clamped.

29. The combination of a frame; a structure pivoted thereto so as to be free to oscillate; a holder for material mounted on said structure; a stop to limit movement of the structure in one direction; a clamping member consisting of a rotatable plate having means for corrugating a body of material on the holder; means for moving said member to cause it to clamp a body of material and a tag against said holder when the latter has been moved into the position determined by said stop; and means for fastening together the tag and material when these have been given a corrugated form.

30. The combination of a holder for material; means for pressing a tag into engagement therewith; and means for inserting a pin through said tag and material consisting of a wheel formed to support a pin-carrying web, and a plunger for forcing a pin from said wheel into the tag and material.

31. The combination of a holder for material; means for pressing a tag into engagement therewith; means for inserting a pin through said tag and material consisting of a wheel supporting a pin-carrying web; means for transferring the pins from the web to the wheel; and means for forcing pins from the wheel through successive bodies of material and tags thereon.

32. The combination of a holder for material; means for pressing a tag into engagement therewith; means for inserting a pin through said tag and material consisting of a wheel supporting a pin-carrying web; means for successively breaking the pins out of the web and transferring them to the wheel; a device for successively shifting the longitudinal positions of the pins in the wheel; and a plunger for successively forcing the pins from the wheel into successive bodies of material and tags adjacent the same.

33. The combination of a holder for material; a member for clamping a tag to material on said holder; means for inserting a pin through the material and the tag when these have been clamped together, consisting of a transversely grooved wheel supporting a pin-carrying web; an element carried by the clamping member for transferring pins from the web to the grooves of the wheel; and a plunger for successively forcing the pins from the grooves of the wheel into the material and tag clamped thereto.

34. The combination of a holder for material; a rotary member mounted to clamp a tag to the material on the holder; a wheel mounted at one side of the holder; a clamping member for supporting the pin-carrying web; a plunger for forcing the pins from the wheel into the material and tag clamped on the holder; and a device for successively moving the pins in the web into positions in which they will not interfere with said clamping member.

35. The combination of a holder for material, having a transverse open passage; a member for clamping a tag to the material on the holder and including a passage movable into line with that of said holder; a rotary wheel for supporting a pin-carrying web provided with a series of grooves capable of being successively brought into line with the passages of the holder and of the clamping member; and a plunger for transferring pins from the grooves of the wheel through said passages into successive bodies of material and tags on the holder.

36. The combination of a holder for material having a transverse open passage; a member for clamping a tag to the material on the holder, having a passage movable into line with that of said holder; a rotary wheel for supporting a pin-carrying web provided with a series of grooves capable of being successively brought into line with the passages of the holder and of the clamping member; a plunger for transferring pins from the grooves of the wheel through said passages into the material and tag in the holder; with a device for breaking the pins out of the web on the wheel and transferring them to a groove in the latter before said groove is brought into line with the plunger.

37. The combination of a holder for material mounted to be oscillated by hand; a rotary folding and clamping member; mechanism operatively including a clutch for rotating said member; and means connecting the controlling element of the clutch with the holder for releasing said clutch when said holder is moved to a position adjacent the folding member.

38. The combination of a pivotally mounted holder for material; a clamping member mounted to turn through approximately 180° from a position substantially in the plane of the holder to a position over the same; means for feeding a tag strip over the holder and clamping member; means for cutting a tag from said strip after it has been so fed; means for actuating the clamping member to fold the tag over a body of material on the holding member; and means for inserting a pin transversely through the tag and material.

39. The combination of a pivotally mounted holder for material; a clamping member mounted to turn through approximately 180° from a position substantially in the plane of the holder to a position over the same; means for feeding a tag strip over the holder and clamping member; means for cutting a tag from said strip after it has been so fed; means for actuating the clamping member to fold the tag over the body of material on the holding member; means for giving a corrugated form to the tag and material when these have been clamped between the holder and the clamping member; and means for inserting a pin through at least one corrugation of said tag and material.

In witness whereof we affix our signatures.

STEPHEN B. TILY.
MARTIN O. REHFUSS.
JOHN G. REHFUSS.